(12) United States Patent
Daigle et al.

(10) Patent No.: US 11,646,754 B2
(45) Date of Patent: *May 9, 2023

(54) APPARATUS FOR IMPROVING THE EFFECTIVE PERFORMANCE OF A POWER SOURCE AND ASSOCIATED METHODS

(71) Applicant: Silicon Laboratories Inc., Austin, TX (US)

(72) Inventors: Clayton Daigle, Austin, TX (US); Jeffery Tindle, Austin, TX (US); Matt Williamson, Austin, TX (US); Jeffrey L. Sonntag, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,525

(22) Filed: Jun. 30, 2021

(65) Prior Publication Data

US 2021/0328605 A1 Oct. 21, 2021

Related U.S. Application Data

(63) Continuation of application No. 16/836,801, filed on Mar. 31, 2020, now Pat. No. 11,177,844, which is a continuation of application No. 16/432,839, filed on Jun. 5, 2019, now Pat. No. 10,742,242.

(51) Int. Cl.
*H04B 1/04* (2006.01)
*H02J 3/12* (2006.01)
*H02J 13/00* (2006.01)
*H02J 7/34* (2006.01)
*H02J 3/32* (2006.01)
*H02J 7/00* (2006.01)

(52) U.S. Cl.
CPC ............... *H04B 1/04* (2013.01); *H02J 3/32* (2013.01); *H02J 7/0025* (2020.01); *H02J 7/345* (2013.01); *H02J 2207/20* (2020.01)

(58) Field of Classification Search
None
See application file for complete search history.

(56) References Cited

U.S. PATENT DOCUMENTS

| | | | |
|---|---|---|---|
| 10,596,909 B2 * | 3/2020 | Choi | H02J 7/1423 |
| 2018/0262104 A1 * | 9/2018 | Huang | H02M 3/156 |
| 2020/0328621 A1 * | 10/2020 | Zeine | H02J 7/0047 |
| 2021/0050776 A1 * | 2/2021 | Ma | H02M 3/158 |
| 2021/0075248 A1 * | 3/2021 | De Vos | H02J 7/345 |
| 2021/0123835 A1 * | 4/2021 | Glennon | G01M 99/008 |

* cited by examiner

*Primary Examiner* — Pablo N Tran
(74) *Attorney, Agent, or Firm* — Law Offices of Maximilian R. Peterson

(57) ABSTRACT

An apparatus includes a power management circuit to receive an input voltage and to generate and provide a first output voltage to an energy storage device. The power management circuit further generates and provides a second output voltage to a load. The first output voltage is greater than the input voltage, and the second output voltage is smaller than the first output voltage. The apparatus further includes a monitor circuit to monitor the first output voltage and to provide a signal to the load to indicate when the load may perform an operation.

20 Claims, 15 Drawing Sheets

APPARATUS FOR IMPROVING THE EFFECTIVE PERFORMANCE OF A POWER SOURCE AND ASSOCIATED METHODS

CROSS REFERENCE TO RELATED APPLICATIONS

This application is a continuation of U.S. patent application Ser. No. 16/836,801, filed on Mar. 31, 2020, titled 'Apparatus for Improving the Effective Performance of a Power Source and Associated Methods,' now U.S. Pat. No. 11,177,844, which is a continuation of U.S. patent application Ser. No. 16/432,839, filed on Jun. 5, 2019, titled 'Apparatus for Improving the Effective Performance of a Power Source and Associated Methods,' now U.S. Pat. No. 10,742,242.

TECHNICAL FIELD

The disclosure relates generally to apparatus with improved energy-use performance and, more particularly, to apparatus for improving the effective performance of batteries, and associated methods.

BACKGROUND

With the increasing proliferation of wireless technology, such as Wi-Fi, Bluetooth, and mobile or wireless Internet of things (IoT) devices, more devices or systems incorporate radio frequency (RF) circuitry, such as receivers and/or transmitters. To reduce the cost, size, and bill of materials, and to increase the reliability of such devices or systems, various circuits or functions have been integrated into integrated circuits (ICs). For example, ICs typically include receiver and/or transmitter circuitry.

The growing number of circuit elements, devices, subsystems, etc., has also resulted in a corresponding increase in the amount of power consumed in the products that include such components. In some applications, such as battery powered, mobile, or portable products, a limited amount of power or energy is available. More particularly, typical batteries have a relatively limited capacity, i.e., can provide a limited amount of energy in a given amount of time.

The description in this section and any corresponding figure(s) are included as background information materials. The materials in this section should not be considered as an admission that such materials constitute prior art to the present patent application.

SUMMARY

A variety of apparatus and associated methods are contemplated according to exemplary embodiments. According to one exemplary embodiment, an apparatus includes a power management circuit to receive an input voltage and to generate and provide a first output voltage to an energy storage device. The power management circuit further generates and provides a second output voltage to a load. The first output voltage is greater than the input voltage, and the second output voltage is smaller than the first output voltage. The apparatus further includes a monitor circuit to monitor the first output voltage and to provide a signal to the load to indicate when the load may perform an operation.

According to another exemplary embodiment, an apparatus includes a power management circuit that receives an input voltage and boosts the input voltage to generate and provide a storage voltage to a capacitor. The power management circuit also converts the storage voltage to a supply voltage provided to a transmit (TX) circuitry. The storage voltage is greater than the input voltage. Furthermore, the supply voltage is smaller than the storage voltage. The apparatus additionally includes a monitor circuit to monitor the storage voltage and to provide a signal to the TX circuitry to indicate when the TX circuitry may perform a transmit operation.

According to another exemplary embodiment, a method of providing power to a load includes receiving an input voltage and generating a first output voltage, and providing the first output voltage to an energy storage device. The method further includes generating a second output voltage from the first output voltage, and providing the second output voltage to a load. The method additionally includes monitoring the first output voltage, and providing a signal to the load to indicate when the load may perform an operation.

BRIEF DESCRIPTION OF THE DRAWINGS

The appended drawings illustrate only exemplary embodiments and therefore should not be considered as limiting the scope of the application or of the claimed subject-matter. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to apparatus with improved energy-use performance. More particularly, the disclosure relates to apparatus, such as ICs, subsystems, or systems, for improving the effective performance of batteries in electronic devices and equipment, and associated methods.

For example, some embodiments allow small batteries, which can typically source relatively small currents (for instance, less than 10 mA in some IoT applications), to work in applications that consume relatively large amounts of current (for instance, up to 100 mA or even more (for relatively short periods of time) in the example given above). Furthermore, some embodiments allow batteries whose performance (e.g., useful life, capacity, etc.) suffers in cold weather to have their lives extended or their effective capacities increased.

In some applications, a load, such as a microcontroller unit (MCU), draws periodic bursts (or relatively large amounts) of current from the battery. For example, a battery might supply power to an MCU that includes a wireless device, such as a transmitter. When the wireless device transmits signals, it typically draws relatively large amounts of current from the battery relatively quickly (e.g., in the form of bursts) to perform its operations, such as supply power to the power amplifier.

The battery in such a situation is typically sized based on cost, size, and similar factors, and may be unable to directly supply the current that the wireless device draws for proper operation. In conventional approaches, attempting to draw the current from the battery may cause the MCU and/or the wireless device to not function properly.

Figure 1:
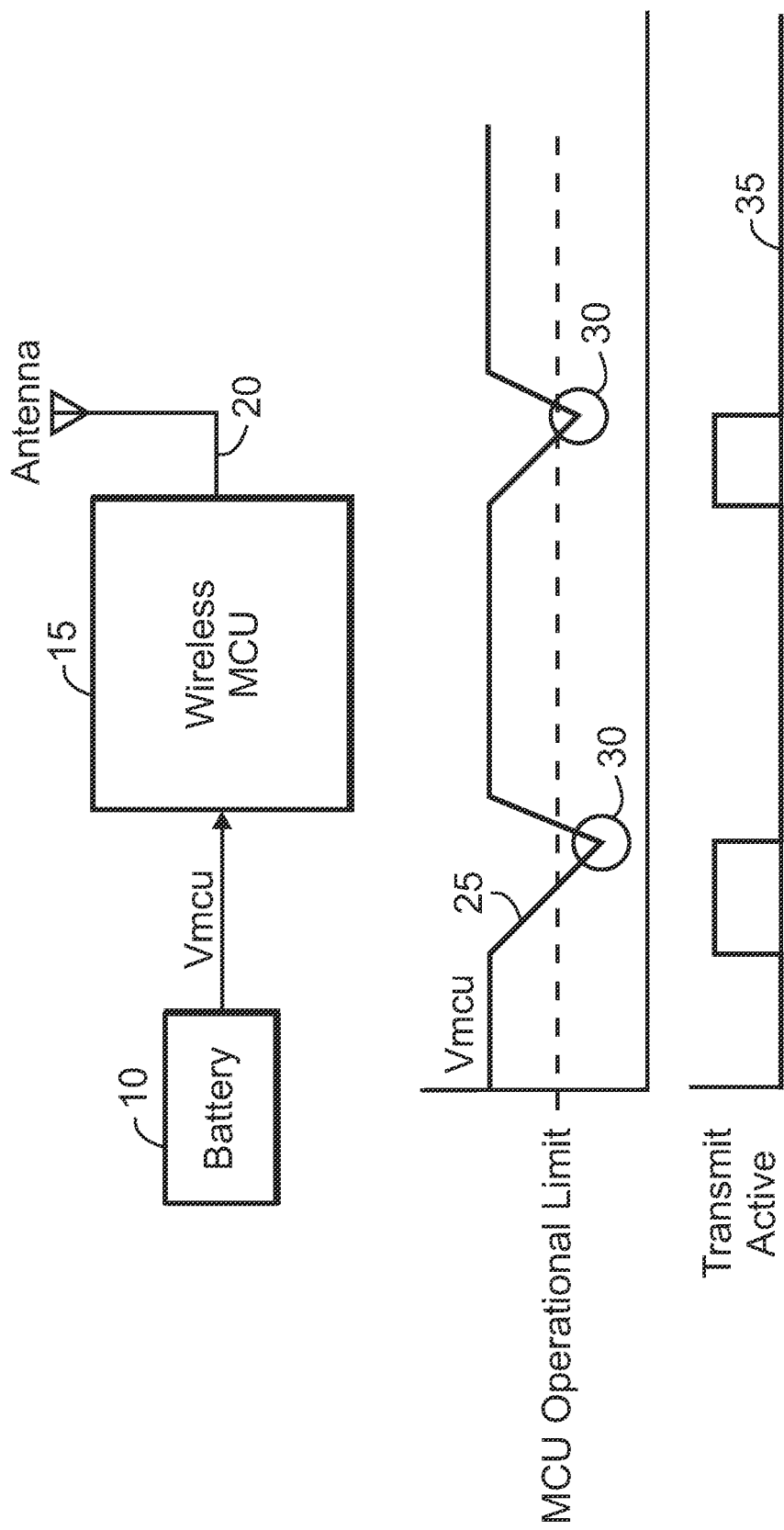
FIG. 1 shows a conventional circuit arrangement and related waveforms.

FIG. 1 shows a conventional circuit arrangement and related waveforms. The battery 10 provides a voltage, Vmcu, to the wireless MCU 15. The wireless MCU 15 transmits RF signals via the antenna 20. The Vmcu waveform, labeled as 25, shows dips 30 in the Vmcu voltage as the wireless MCU 15 transmits RF signals, as indicated by the "Transmit Active" waveform 35.

Attempting to draw too much current from the battery 10 can lead to the MCU voltage level, Vmcu, dropping to a level at which the wireless MCU 15 ceases to work or ceases to operate properly as expected or designed. More specifically, by drawing more current than the battery 10 can supply or sustain during the transmit operation, Vmcu drops below the specified minimum operating voltage of the wireless MCU 15 (labeled "MCU Operational Limit"). Drawing too much current from the battery can also shorten the battery's life, i.e., the battery delivers less total energy over its lifetime than would otherwise be expected or specified.

Figure 2:
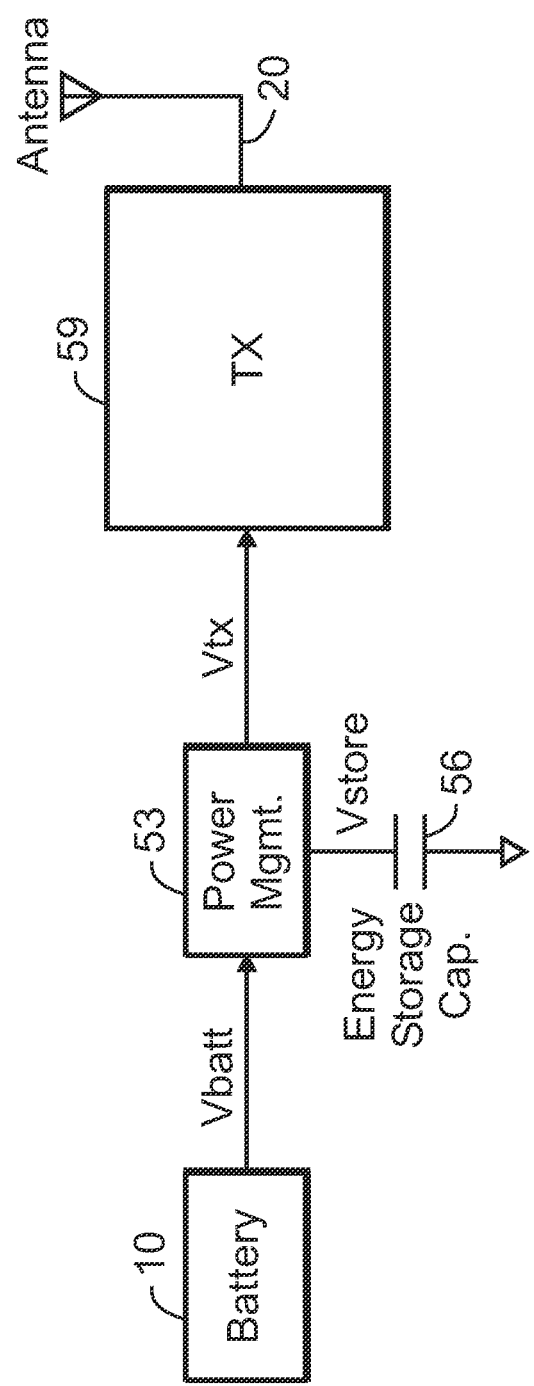
FIG. 2 shows a circuit arrangement for providing power to a load according to an exemplary embodiment.

FIG. 2 shows a circuit arrangement for providing power to a load by using an energy storage capacitor, or generally capacitor 56, holding a storage voltage Vstore (i.e., the voltage across the energy storage device, e.g., the capacitor 56). In order to improve the effective performance of the battery, a power management system is used to store energy in the capacitor 56 (or other storage element, components, or device) for use when called for by the transmit circuitry (labeled "TX") 59 (or TX circuitry 59). The TX circuitry 59 can include a variety of circuitry, such as MCU circuitry, RF circuitry, other load or circuit (whether transmitting or other type of circuit), etc.

The circuit arrangement uses a power management circuit 53 to provide power to the transmit circuitry 59. The power management circuitry 53 can provide a relatively large voltage (larger than the battery voltage, Vbatt), labeled as Vstore, across the capacitor 56. The voltage across the capacitor 56 equates to energy storage, and the stored energy may be used when use that energy when the TX circuitry 59 draws more current than the battery 10 can supply, such as during transmission.

Figure 3:
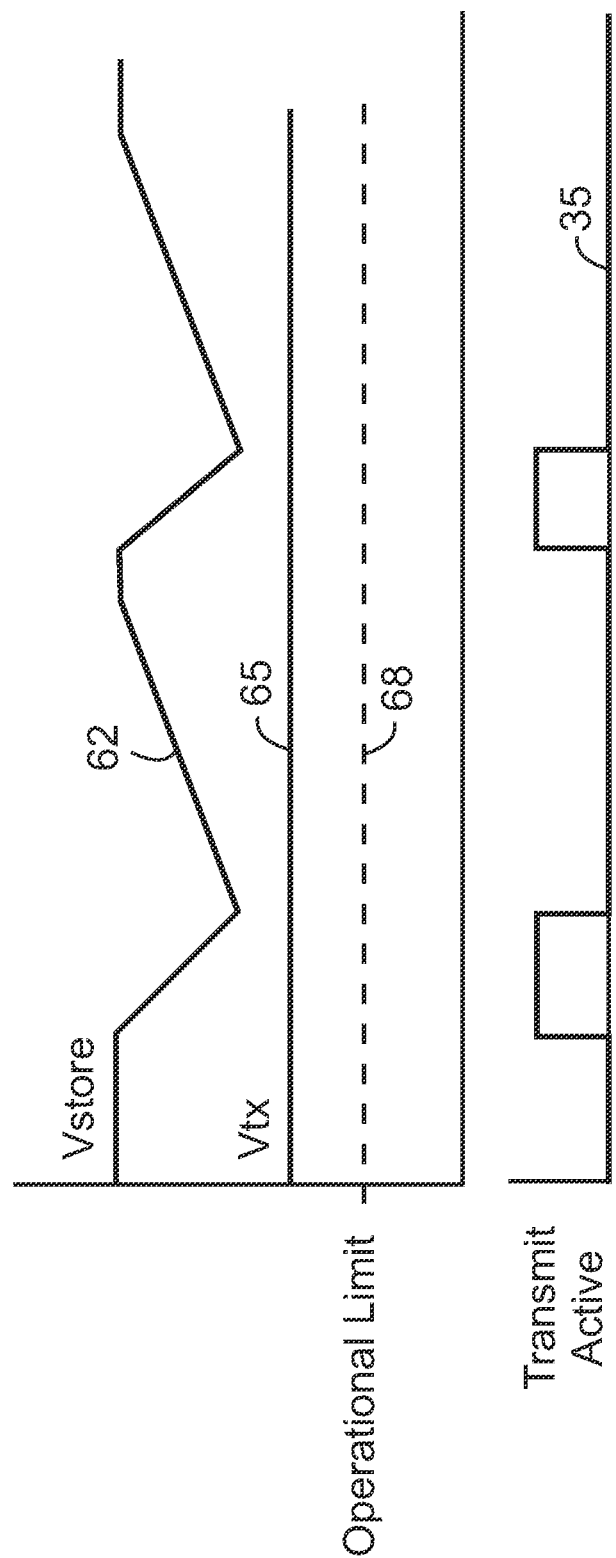
FIG. 3 shows waveforms relating to a circuit arrangement according to an exemplary embodiment.

FIG. 3 shows waveforms relating to the circuit arrangement in FIG. 2. During transmission, the level of Vstore 62 is reduced, but the voltage Vtx 65 (the voltage across the TX circuitry 59) is held steady (or relatively or nearly steady, as is the case in practical physical implementation) by virtue of the fact that Vstore is higher than Vbatt and Vtx, and by virtue of the operation of power management circuit 53, which supplies energy to the capacitor 56.

As shown in FIG. 3, the circuit provides for the voltage Vtx 65 to be higher than the minimum operational limit voltage 68 during the active periods of the Transmit Active voltage 35. Thus, the energy from the storage capacitor 56 is supplying most of the power to the TX circuitry 59, and the battery 10 is mainly used to recharge the storage capacitor 56 in between transmissions (i.e., when the TX circuitry 59 is not transmitting). Furthermore, the risk of damaging the battery 10 or shortening its lifespan is reduced because the rate at which the Vstore 62 is restored can be made relatively or fairly slow by the power management circuit 53, which equates to relatively low currents drawn from the battery 10.

Figure 4:
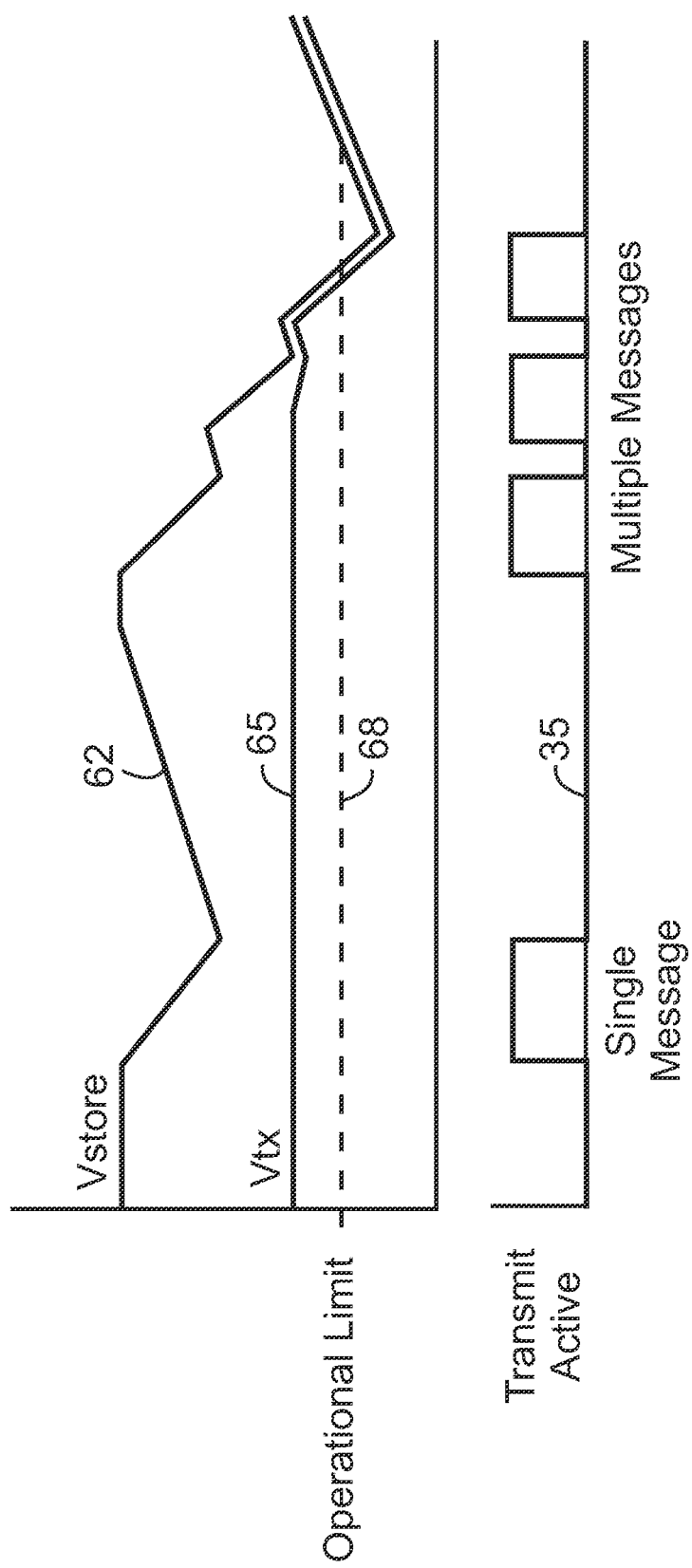
FIG. 4 shows additional waveforms relating to a circuit arrangement according to an exemplary embodiment.

In some situations, the TX circuitry 59 may perform a relatively large number of operations, such as transmitting RF signals, in a relatively short amount of time. FIG. 4 shows such a situation. More specifically, the Transmit Active voltage 35 shows a single message sent that causes a corresponding dip in the Vstore voltage 62. The difference in voltage between the Vstore voltage 62 and the minimum operational limit 68 represents an energy reserve stored on the capacitor 56, which can be drawn down when the TX circuitry 59 is active. By properly sizing the capacitance of the capacitor 56 and the nominal value of the Vstore voltage 62 compared to minimum operational limit, the system has enough reserve energy to keep the Vtx voltage 65 at a relatively constant value during a single TX operation. In other words, even while the single message is being transmitted, the Vtx voltage 65 is above the minimum operational limit voltage 68.

In contrast, when multiple messages are transmitted (see the Transmit Active voltage 35), the energy stored in the capacitor 56 can become depleted sufficiently in order for the Vstore voltage 62 to drop. As a consequence, the power management circuitry 53 does not have energy reserves on the capacitor 56 on which to draw to supplement the current from the battery 10. In turn, the Vtx voltage 65 drops to the point where it is below the operation limit voltage 68. The TX circuitry 59 ceases to operate properly or as intended or desired.

Figure 5:
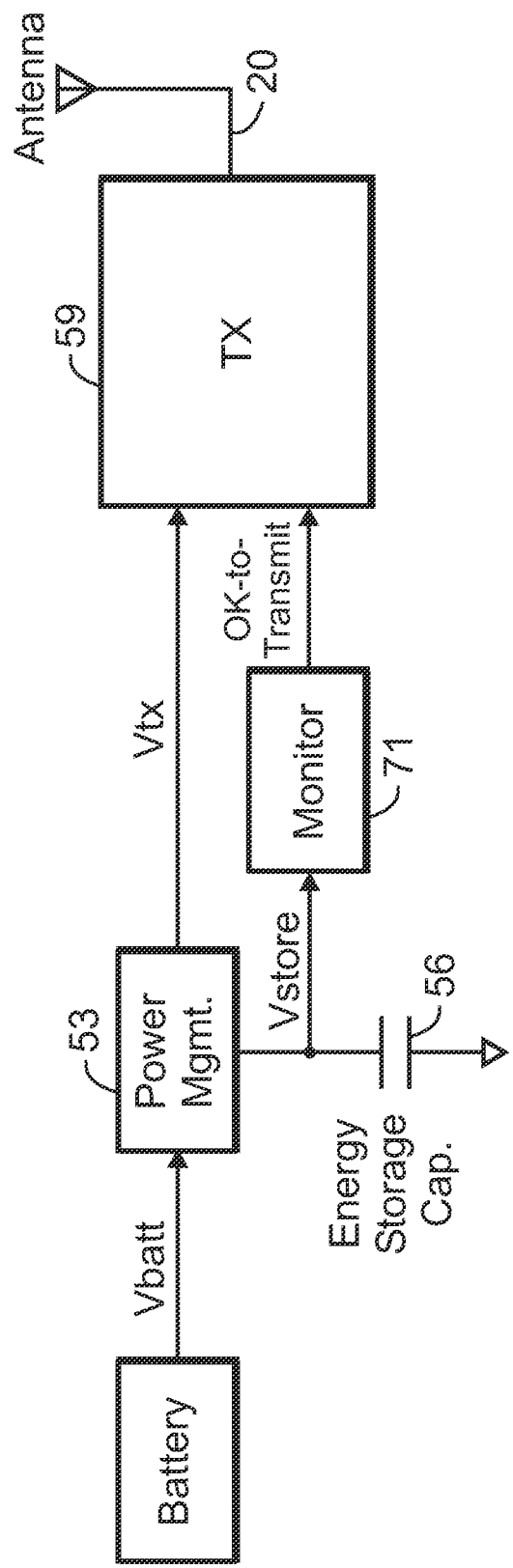
FIG. 5 shows a circuit arrangement for providing power to a load according to an exemplary embodiment.

According to one aspect of the disclosure, a handshaking mechanism is used to avoid the situation described above. FIG. 5 shows a circuit arrangement for providing power to a load according to an exemplary embodiment that uses a handshaking mechanism.

More specifically, the circuit arrangement includes a monitor circuit 71. The monitor circuit 71 monitors the level of energy storage in the capacitor 56 (or other energy storage device or component or circuit used in various embodiments). Generally, the monitor circuit 71 determines the level of stored energy, depending on the type of storage device used.

In the case of a capacitor, the level of stored energy depends on the capacitance of, and the voltage across, the capacitor 56. Thus, by using the capacitance of the capacitor 56 (which is known a priori), the monitor circuit 71 derives the quantity or level of energy stored in the capacitor 56, and uses the quantity to provide a signal to the TX circuitry 59. In the case of the capacitor 56 being used as the energy storage device, the monitor circuit 71 may simply constitute a voltage comparator that compares the voltage across the capacitor 56 with the minimum level (labeled "Vstore Min. for Transmit") of the Vstore voltage 62 that allows a transmit operation to be performed properly.

Figure 6:
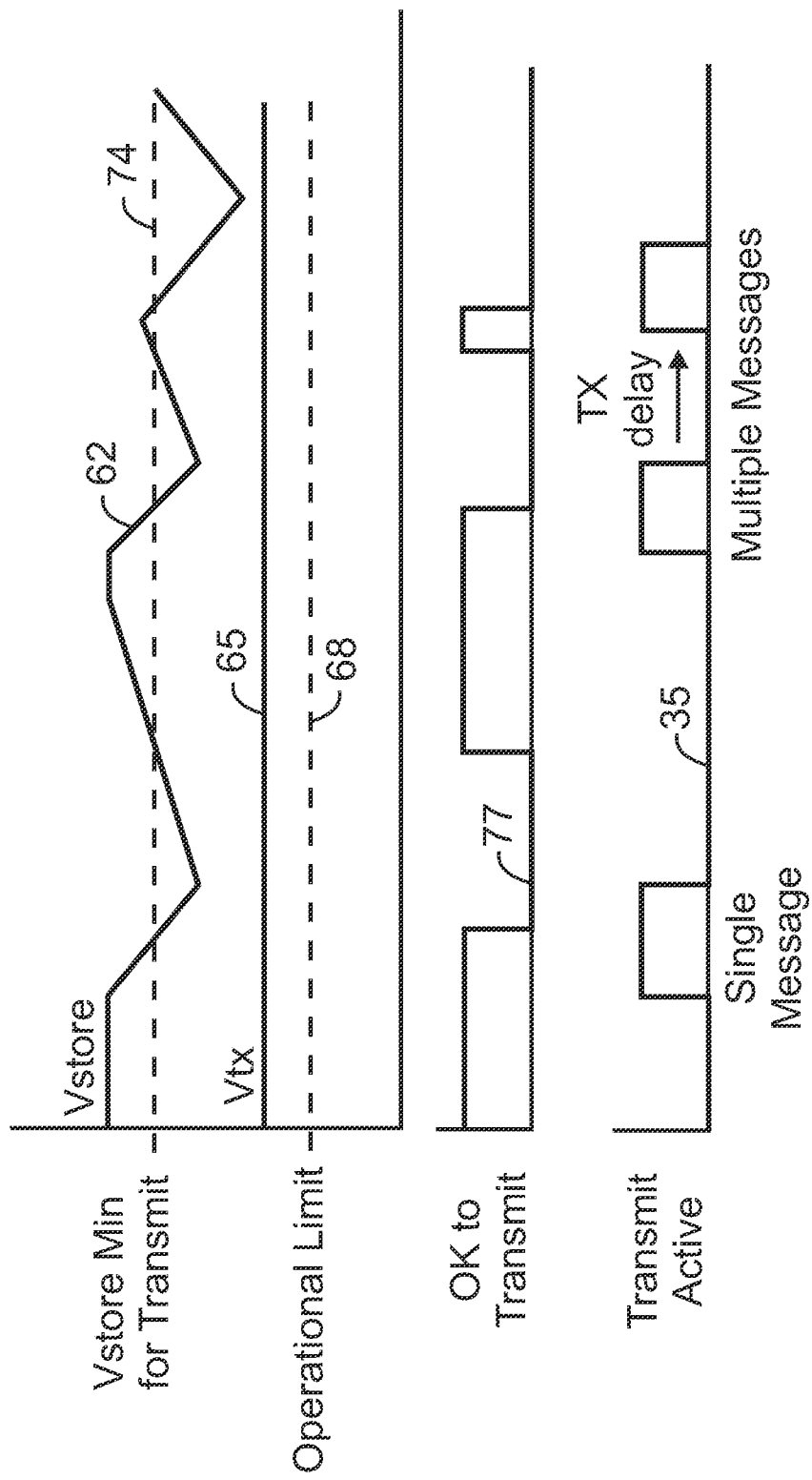
FIG. 6 shows waveforms relating to a circuit arrangement according to an exemplary embodiment.

In the embodiment shown in FIG. 5, the signal is labeled "OK-to-transmit" (OKTT). The OKTT signal is provided to the TX circuitry 59. The TX circuitry 59 does not engage in transmit operations unless the OKTT signal indicates that the storage device (e.g., the capacitor 56) has enough stored energy to sustain the transmit operation. FIG. 6 shows waveforms corresponding to this scheme.

When the Vstore voltage 62 is above the "Vstore Min. for Transmit" level, the OKTT signal 77 has a logic high value (the monitor circuit 71 asserts the OKTT signal 77), which indicates to the TX circuitry 59 that it may perform a transmit operation. When the transmit operation is performed, the level of the Vstore voltage 62 decreases, and eventually falls below the "Vstore Min. for Transmit" level.

At that point, the monitor circuit 71 de-asserts the OKTT signal 77, which causes the TX circuitry to refrain further transmit operations. As shown in FIG. 6 for the case of multiple messages (multiple transmit operations), the de-assertion of the OKTT signal 77 causes a delay in the transmit operations. In other words, the TX circuitry delays the transmit operation until the monitor circuit 71 once again asserts the OKTT signal 77.

This scheme may be used in communication systems that use coexistence signaling. Coexistence signaling (also known as packet traffic arbitration, or PTA, signaling) is used in certain communication standards, such as the Institute of Electrical and Electronics Engineers (IEEE) 802.15.2 standard. As persons of ordinary skill in the art understand, PTA or coexistence signaling is used to prevent two ICs or transmitters from transmitting at the same time.

Figure 7:
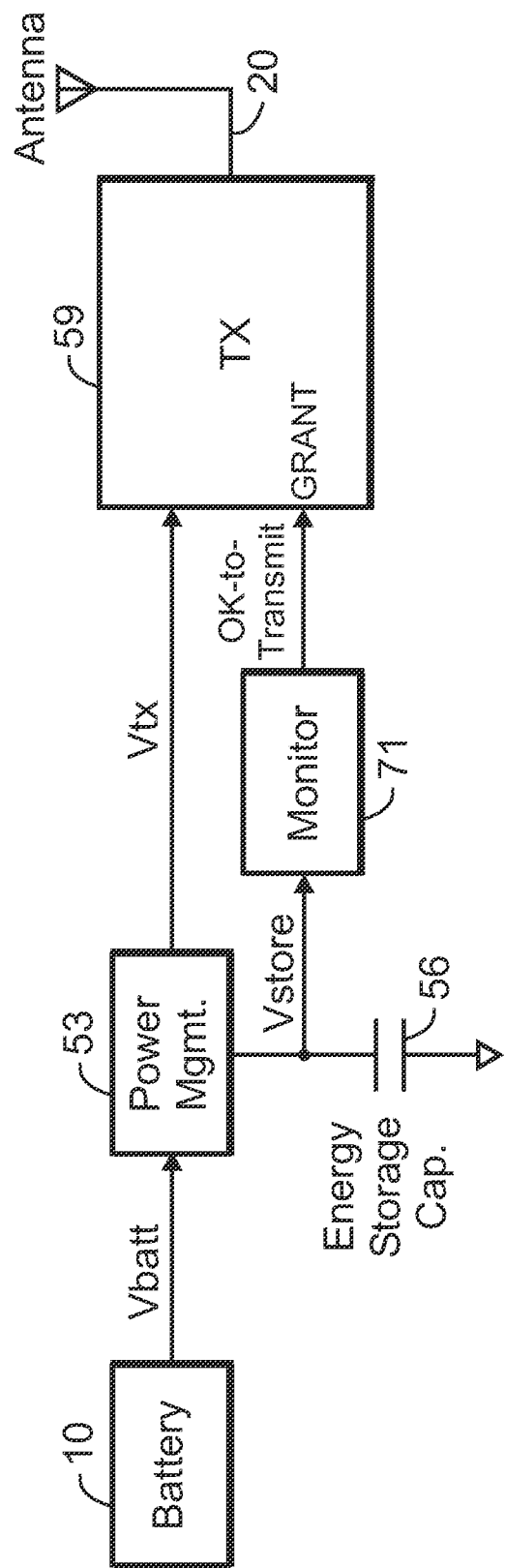
FIG. 7 shows a circuit arrangement for providing power to a load according to an exemplary embodiment.

PTA or coexistence signaling may be applied to the circuit arrangement in FIG. 5. FIG. 7 shows the resulting circuit arrangement according to an exemplary embodiment. More specifically, the OKTT signal in FIG. 7 drives a "GRANT" input of the TX circuitry 59. The GRANT input is used by the TX circuitry 59 as part of a PTA or coexistence signaling scheme. In response to the OKTT signal being asserted (the GRANT signal being asserted), the TX circuitry 59 commences a transmit operation, and vice-versa.

Using the OKTT signal as the GRANT signal in a PTA or coexistence signaling application allows taking advantage of well-defined mechanisms of transmission hold-off that are used in communication system standards. An example of such a standard is the IEEE 802.15.4 standard. Another example of such a standard is the standard governing Bluetooth applications.

The scheme illustrated in FIGS. 5 and 7 and described above uses one-way handshaking (the monitor circuit 71 provides the OKTT signal (the GRANT signal) to TX circuitry 59). In some embodiments, a two-way handshaking scheme is used. FIG. 7 illustrates a circuit arrangement according to an exemplary embodiment.

Figure 8:
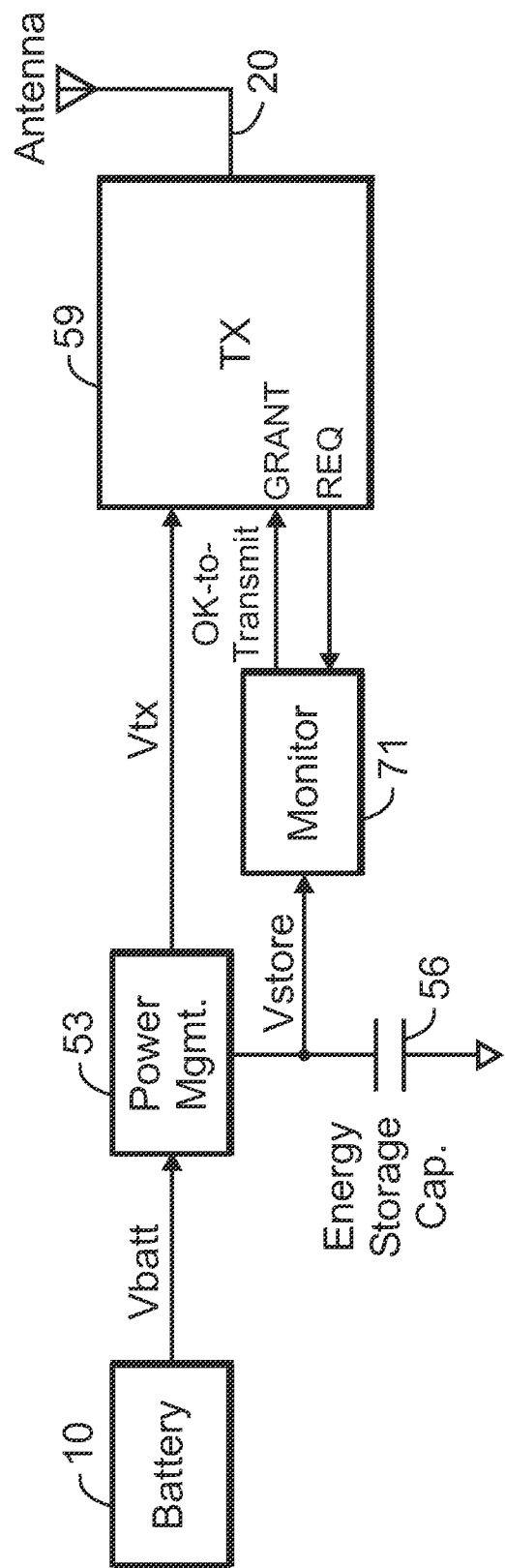
FIG. 8 shows a circuit arrangement for providing power to a load according to another exemplary embodiment.

More specifically, similar to the embodiments described above, the embodiment in FIG. 8 uses the OKTT signal as the GRANT signal as part of a PTA or coexistence signaling arrangement. In addition, the embodiment in FIG. 8 uses a request (REQ) signal as part of the PTA or coexistence signaling arrangement.

By using the REQ signal, the TX circuitry 59 can signal the monitor circuit 71 that is ready, or seeks to, commence a transmit operation. Through the OKTT (GRANT) signal, the monitor circuit 71 signals the TX circuitry 59 when it may commence a transmit operation. In this manner, a two-way handshaking is established between the monitor circuit 71 and the TX circuitry 59.

In some embodiments, the REQ signal can be used to reduce power consumption of the monitor circuit 71. More specifically, the monitor circuit 71 or parts of it is or are powered down (or shut down or put in a low-power state (compared to the powered up or normal operation state) when the REQ signal is not asserted by the TX circuitry 59.

Part of the monitor circuit 71 remains powered even if the REQ signal is de-asserted in order to sense changes in the REQ signal. Other parts of the monitor circuit 71 may be powered down to conserve energy.

Conversely, when the REQ signal is asserted, i.e., when the TX circuitry 59 indicates that it seeks to perform a transmit operation, the monitor circuit 71 moves from the powered down state to a normal operation state, where it can respond to the assertion of the REQ signal, as described above. In this manner, the overall power consumption in such embodiments may be reduced.

The powering down of the circuitry in the monitor circuit 71 may be realized in a variety of ways, as persons of ordinary skill in the art will understand. For example, one or more bias signals in or used by the monitor circuit 71 are disabled or modified. As another example, power may be switched off to parts of the monitor circuit 71 (e.g., by using a transistor to control the provision of power). Other possibilities exist and are contemplated, as persons of ordinary skill in the art will understand.

Figure 9:
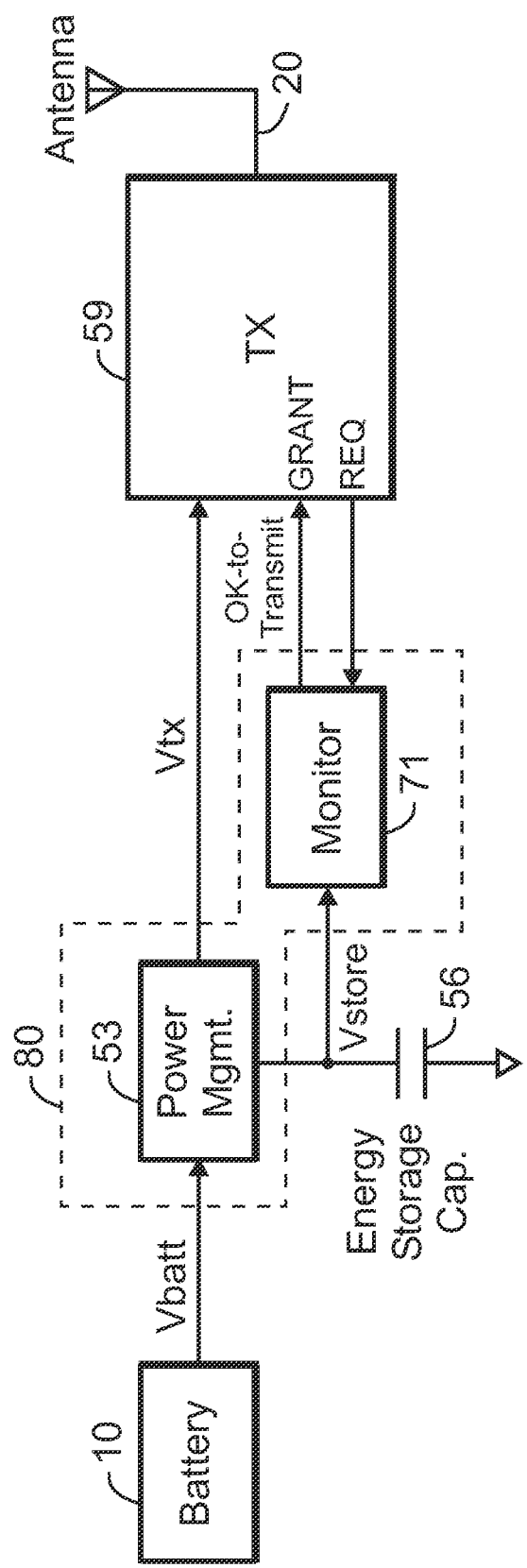
FIG. 9 shows a circuit arrangement for providing power to a load according to another exemplary embodiment.
Figure 10:
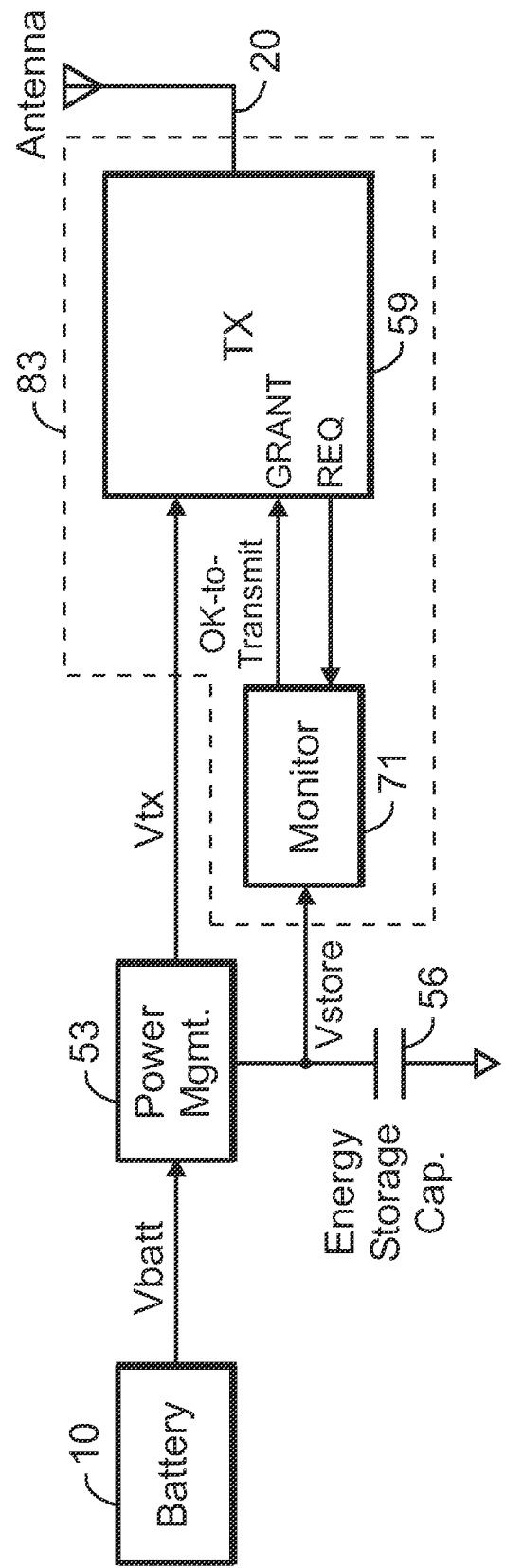
FIG. 10 shows a circuit arrangement for providing power to a load according to another exemplary embodiment.

In various embodiments described above, the monitor circuit 71 is shown as circuitry separate from the power management circuit 53 and the TX circuitry 59. Other variations, however, are possible and are contemplated. FIGS. 9 and 10 show examples according to exemplary embodiments.

Referring to FIG. 9, in this embodiment, the circuitry in the monitor circuit 71 is merged with or is included in the circuitry for the power management circuit 53. The circuitry corresponding to the monitor circuit 71 (included in the power management circuit 53 in this example) otherwise performs the functionality described above.

Referring to FIG. 10, in this embodiment, the circuitry in the monitor circuit 71 is merged with or is included in the circuitry for the TX circuitry 59. The circuitry corresponding to the monitor circuit 71 (included in the TX circuitry 59 in this example) otherwise performs the functionality described above.

Figure 11:
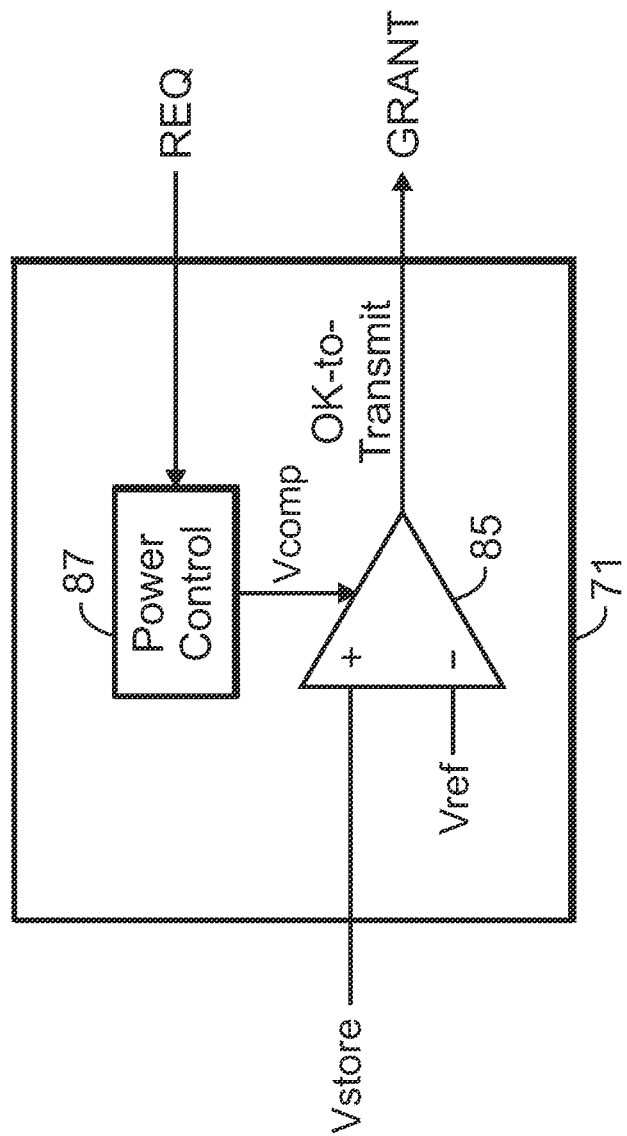
FIG. 11 shows a circuit arrangement for a monitor circuit according to an exemplary embodiment.

In various embodiments, the circuitry corresponding to the monitor circuit 71 may be realized in a variety of ways, as persons of ordinary skill in the art will understand. For instance, FIG. 11 illustrates the monitor circuit 71 according to an exemplary embodiments.

More specifically, in this embodiment, the monitor circuit 71 includes a comparator 85 and a power control circuit 87. The comparator 85 compares the Vstore voltage with a reference voltage (Vref). Depending on the relative values of the Vstore voltage and the Vref voltage, the comparator 85 generates as its output voltage the OKTT signal (the GRANT signal).

Thus, if the Vstore voltage is above a threshold (Vref), then sufficient energy is available in the energy storage device (e.g., the capacitor 56 (not shown)) for a transmit operation to proceed. The comparator 85 asserts the OKTT signal to indicate this condition. Conversely, if the Vstore voltage is below the threshold (Vref), then sufficient energy is unavailable in the energy storage device for a transmit operation to proceed. In this scenario, the comparator 85 de-asserts the OKTT signal.

The power control circuit 87 provides power to the comparator 85. More specifically, the power control circuit 87 provides a supply voltage Vcomp to the comparator 85. The power control circuit 87 changes the value of the Vcomp voltage depending on the state of the REQ signal.

More specifically, if the REQ signal is de-asserted (i.e., no transmit operation is sought), the power control circuit 87 reduces the Vcomp voltage (e.g., to the ground potential). As a result, the circuitry in the comparator 85 is powered down to conserve energy, as described above.

Conversely, if the REQ signal is asserted (i.e., a transmit operation is sought), the power control circuit 87 increases the Vcomp voltage (e.g., to an appropriate supply voltage for the comparator 85). As a result, the circuitry in the comparator 85 is powered, and performs the compare operation described above.

Note that the embodiment shown in FIG. 11 corresponds to controlling the provision of power to the comparator 85 by controlling its supply voltage. As noted above, however, other possibilities exist for reducing the power consumption of the monitor circuit 71, for example, by modifying one or more bias signals used by the monitor circuit 71. In such a scenario, rather than controlling the supply voltage of the comparator 85 as shown in FIG. 11, the power control circuit 87 modifies the bias signal(s) used by the comparator 85.

Figure 12:
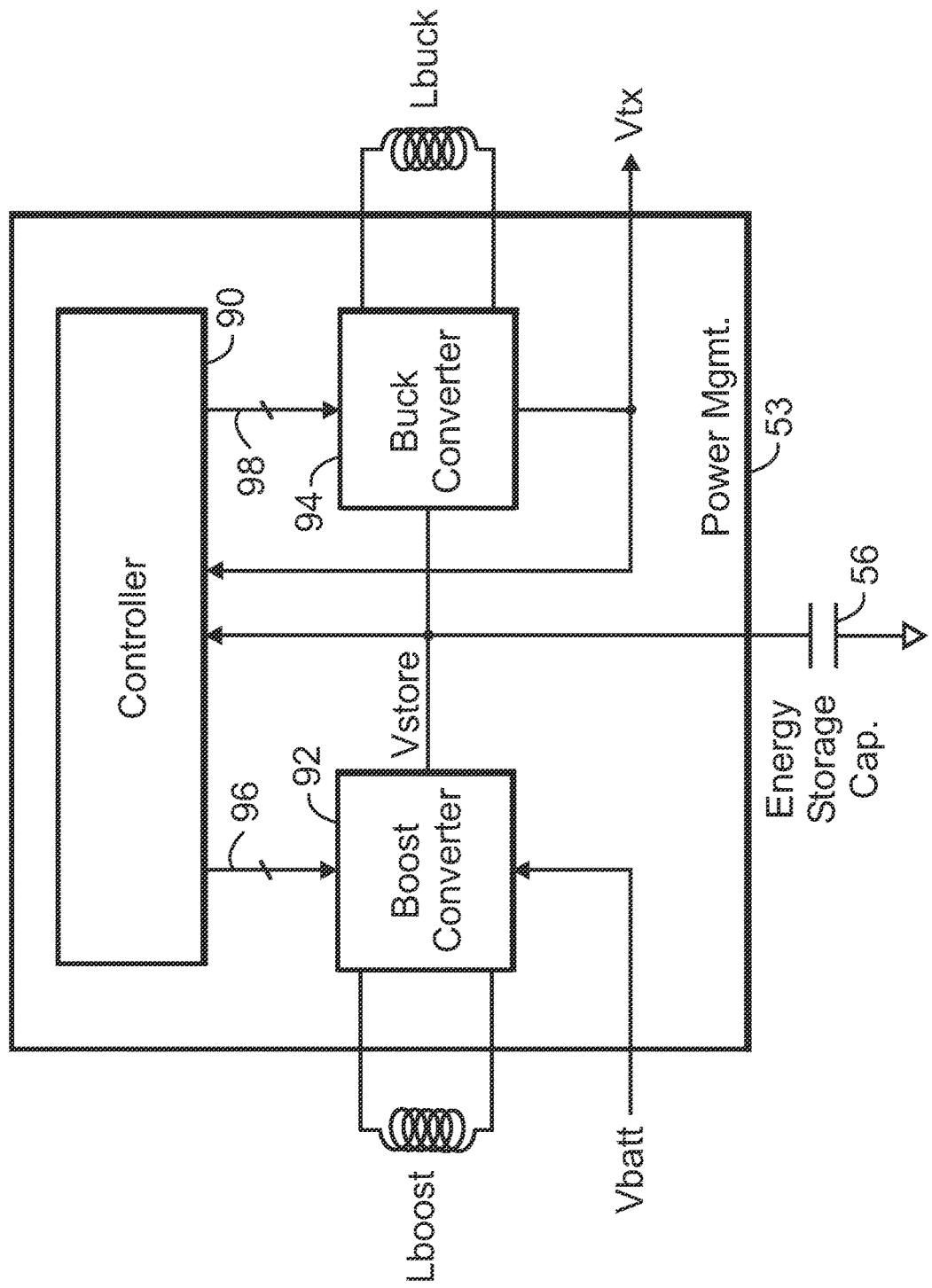
FIG. 12 shows a circuit arrangement for a power management circuit according to an exemplary embodiment.

FIG. 12 shows a circuit arrangement for the power management circuit 53 according to an exemplary embodiment. In this embodiment, the power management circuit 53 uses a boost (step-up) power converter 92 to generate the Vstore voltage, using the voltage Vbatt as an input voltage. In addition, the power management circuit 53 uses a buck (step-down) power converter 94 to generate the Vtx voltage, using the voltage Vstore as an input voltage. A controller 90 controls the operations of the power management circuit 53, including the operations of the boost converter 92 and the buck converter 94.

More specifically, the battery 10 (not shown) provides the voltage Vbatt to the boost converter 92. The boost converter 92 performs the voltage step-up operation using the inductor Lboost, as persons of ordinary skill in the art will understand. Thus, the boost converter 92 steps up the voltage Vbatt to the output voltage Vstore.

The voltage Vstore is provided to the energy storage device, as described above. In the exemplary embodiment shown, the energy storage device constitutes the capacitor 56. As described above, the voltage Vstore is larger than the voltage Vbatt.

The voltage Vstore is used as the input voltage of the buck converter 94. The buck converter 94 performs the voltage step-down operation using the inductor Lbuck, as persons of ordinary skill in the art will understand. Thus, the buck converter 94 steps down the voltage Vstore to the output voltage Vtx. As described above, the voltage Vstore is larger than the voltage Vtx.

The voltage Vstore is also provided to controller 90. The controller 90 uses the voltage Vstore to generate and to provide to the boost converter 92 a set of control signals 96, as persons of ordinary skill in the art will understand. The set of control signals 96 are used to control the various operations of the boost converter 92, such as turn on and turn off power switches (not shown), disable or enable the operation of the boost converter 92, etc., as persons of ordinary skill in the art will understand.

Similarly, the controller 90 uses the voltage Vstore and the voltage Vtx to generate and to provide to the buck converter 94 a set of control signals 98, as persons of ordinary skill in the art will understand. The set of control signals 98 are used to control the various operations of the buck converter 94, such as turn on and turn off power switches (not shown), disable or enable the operation of the buck converter 94, etc., as persons of ordinary skill in the art will understand.

Note that the circuit arrangement illustrated in FIG. 12 constitutes merely an example. Other ways of realizing the power management circuit 53 are possible and are contemplated, as persons of ordinary skill in the art will understand. Furthermore, other types of converter may be used (e.g., buck-boost), as desired, and as persons of ordinary skill in the art will understand. The choice of converter type and topology depends on factors such as design specifications, performance specifications, cost, IC or device area, available technology, such as semiconductor fabrication technology), target markets, target end-users, etc., as persons of ordinary skill in the art will understand.

Furthermore, although the disclosure uses the transmit circuitry 59 to illustrate various concepts, other circuitry may be used in various embodiments, as persons of ordinary skill in the art will understand. Generally, the circuit 59 may constitute a load that draws periodic amounts of current or draws bursts of current during its operation, as persons of ordinary skill in the art will understand.

Figure 13:
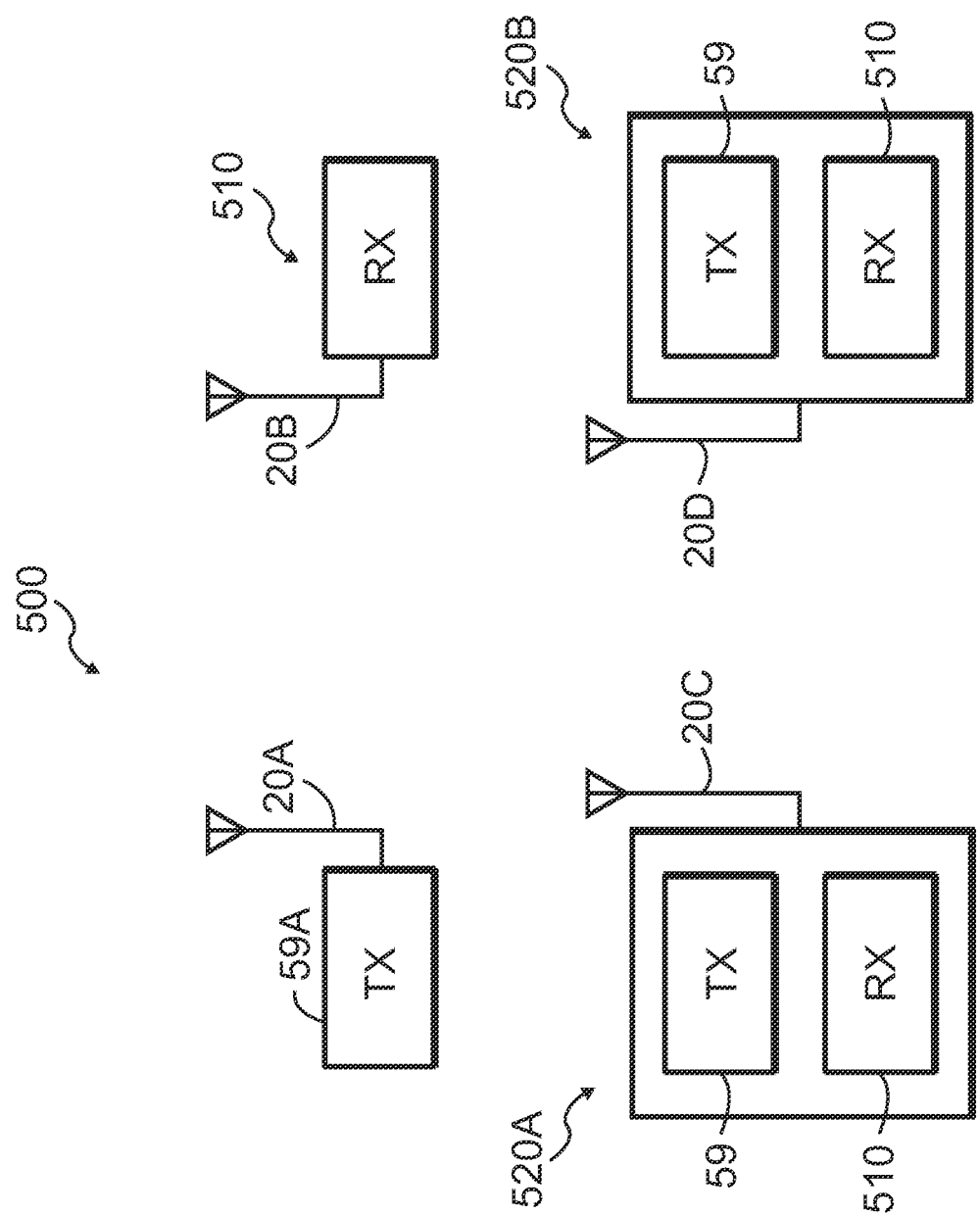
FIG. 13 shows a system for radio communication according to an exemplary embodiment.

Circuitry according to various embodiments may be used in a variety of circuits, systems, subsystems, ICs, and the like, such as communication arrangements, systems, subsystems, networks, etc., as desired. FIG. 13 shows a system 500 for radio communication according to an exemplary embodiment. The TX circuitry 59 in system 500 may use or be based on circuitry according to various embodiments, such as described above. Thus, the TX circuitry 59 may include an energy storage device to provide power to the transmit circuitry, as described above.

Referring to FIG. 13, system 500 includes the TX circuitry 59A, coupled to antenna 20A. Via antenna 20A, the TX circuitry 59A transmits RF signals. The RF signals may be received by the receiver 510. In addition, or alternatively, the transceiver 520A and/or the transceiver 520B might receive (via the receiver 510) the transmitted RF signals.

In addition to receive capability, the transceiver 520A and the transceiver 520B can also transmit RF signals by using the TX circuitry 59. The transmitted RF signals might be received by receiver 510, either in the stand-alone receiver, or via the receiver circuitry of the non-transmitting transceiver.

Other systems or sub-systems with varying configuration and/or capabilities are also contemplated. For example, in some exemplary embodiments, two or more transceivers (e.g., the transceiver 520A and the transceiver 520B) might form a network, such as an ad-hoc network. As another example, in some exemplary embodiments, the transceiver 520A and the transceiver 520B might form part of a network, for example, in conjunction with the TX circuitry 59A.

Figure 14:
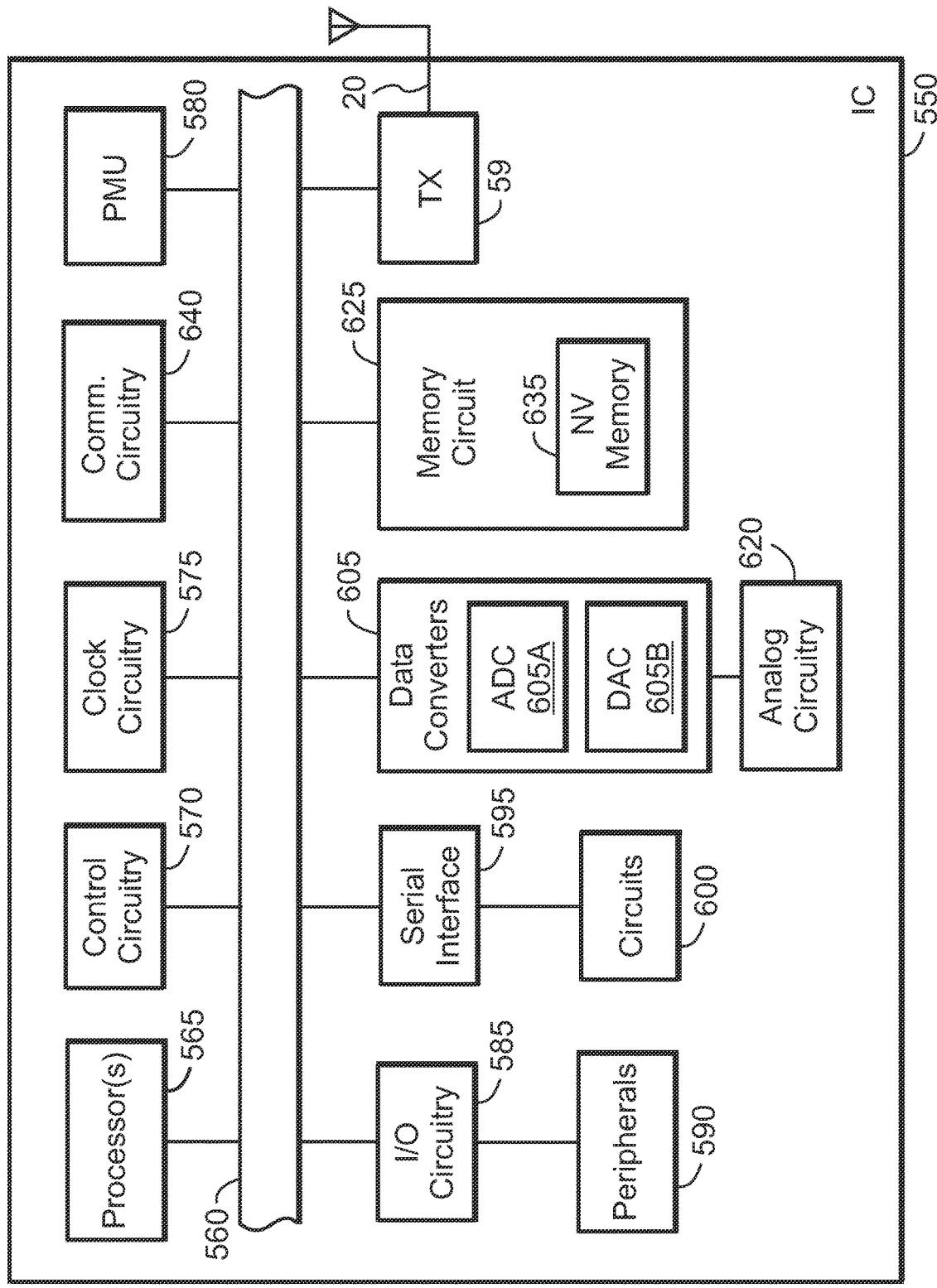
FIG. 14 shows a circuit arrangement for an IC, including transmit circuitry, according to an exemplary embodiment.
Figure 15:
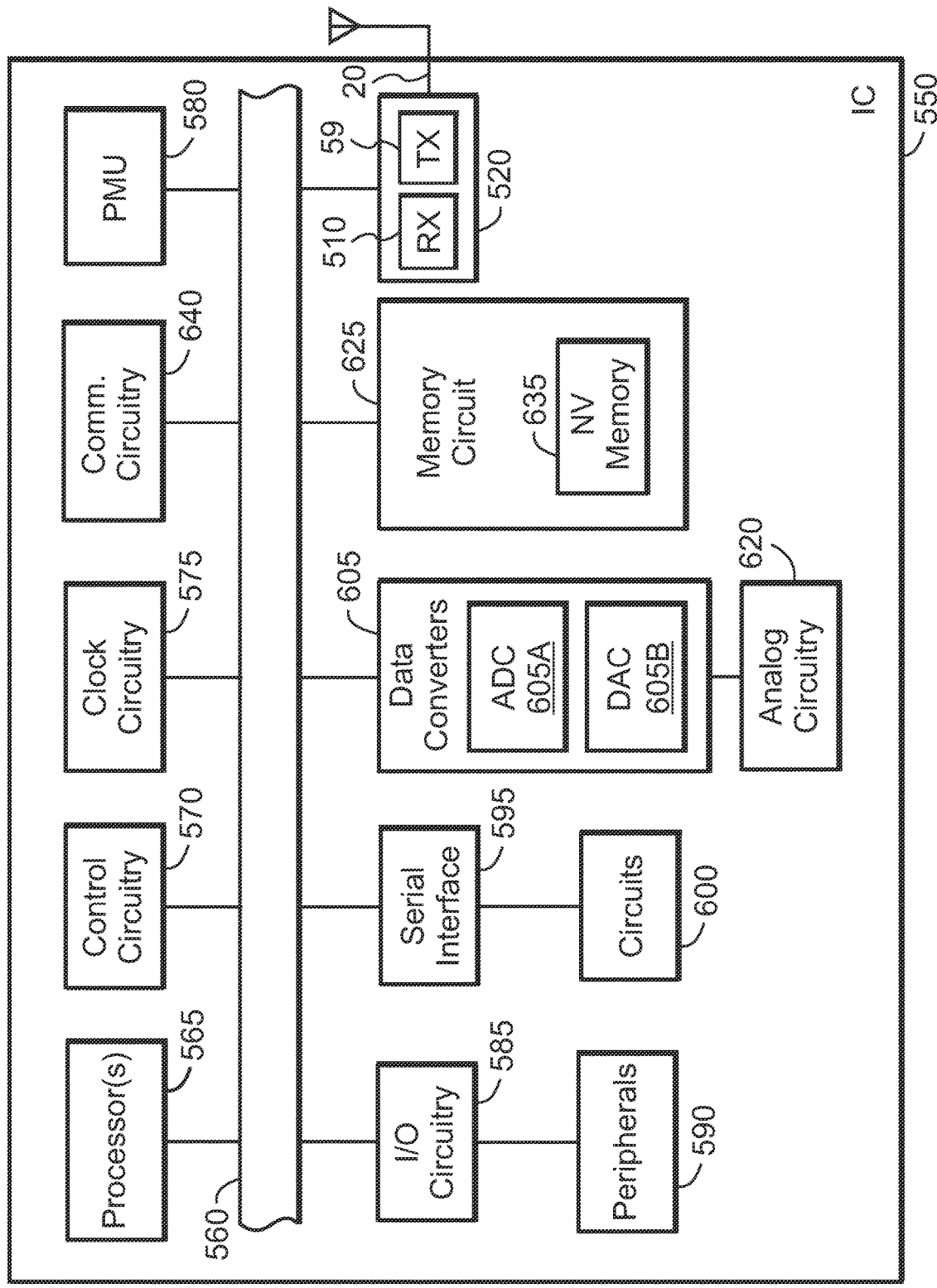
FIG. 15 shows a circuit arrangement for an IC, including both transmit and receiver circuitry, according to an exemplary embodiment.

The circuitry according to various embodiments, such as described above, may be used in a variety of circuits, blocks, subsystems, and/or systems. For example, in some embodiments, such circuitry may be integrated in an IC, such as an MCU. FIG. 14 shows a block diagram of an IC 550 according to an exemplary embodiment. FIG. 15 shows a block diagram of the IC 550 which, in addition to the TX circuitry 59, also includes the receiver 510, as part of the transceiver 520.

The circuit arrangement includes an IC 550, which constitutes or includes an MCU. IC 550 includes a number of blocks (e.g., processor(s) 565, data converter 605, I/O circuitry 585, etc.) that communicate with one another using a link 560. In exemplary embodiments, link 560 may constitute a coupling mechanism, such as a bus, a set of conductors or semiconductor elements (e.g., traces, devices, etc.) for communicating information, such as data, commands, status information, and the like.

IC 550 may include link 560 coupled to one or more processors 565, clock circuitry 575, and power management circuitry or power management unit (PMU) 580. In some embodiments, processor(s) 565 may include circuitry or blocks for providing information processing (or data processing or computing) functions, such as central-processing units (CPUs), arithmetic-logic units (ALUs), and the like. In some embodiments, in addition, or as an alternative, processor(s) 565 may include one or more DSPs. The DSPs may provide a variety of signal processing functions, such as arithmetic functions, filtering, delay blocks, and the like, as desired.

Clock circuitry 575 may generate one or more clock signals that facilitate or control the timing of operations of one or more blocks in IC 550. Clock circuitry 575 may also control the timing of operations that use link 560, as desired. In some embodiments, clock circuitry 575 may provide one or more clock signals via link 560 to other blocks in IC 550.

In some embodiments, PMU 580 may reduce an apparatus's (e.g., IC 550) clock speed, turn off the clock, reduce power, turn off power, disable (or power down or place in a lower power consumption or sleep or inactive or idle state), enable (or power up or place in a higher power consumption or normal or active state) or any combination of the foregoing with respect to part of a circuit or all components of a circuit, such as one or more blocks in IC 550. Further, PMU 580 may turn on a clock, increase a clock rate, turn on power, increase power, or any combination of the foregoing in response to a transition from an inactive state to an active state (including, without limitation, when processor(s) 565 make a transition from a low-power or idle or sleep state to a normal operating state).

The PMU 580 may further include controller 90 (not shown) and power management circuit 53 (not shown). Thus, together with an energy storage device (not shown), the PMU 580 provides power to the TX circuitry 59, as described above.

Link 560 may couple to one or more circuits 600 through serial interface 595. Through serial interface 595, one or more circuits or blocks coupled to link 560 may communicate with circuits 600. Circuits 600 may communicate using one or more serial protocols, e.g., SMBUS, I²C, SPI, and the like, as person of ordinary skill in the art will understand.

Link 560 may couple to one or more peripherals 590 through I/O circuitry 585. Through I/O circuitry 585, one or more peripherals 590 may couple to link 560 and may therefore communicate with one or more blocks coupled to link 560, e.g., processor(s) 565, memory circuit 625, etc.

In exemplary embodiments, peripherals 590 may include a variety of circuitry, blocks, and the like. Examples include I/O devices (keypads, keyboards, speakers, display devices, storage devices, timers, sensors, etc.). Note that in some embodiments, some peripherals 590 may be external to IC 550. Examples include keypads, speakers, and the like.

In some embodiments, with respect to some peripherals, I/O circuitry 585 may be bypassed. In such embodiments, some peripherals 590 may couple to and communicate with link 560 without using I/O circuitry 585. In some embodiments, such peripherals may be external to IC 550, as described above.

Link 560 may couple to analog circuitry 620 via data converter(s) 605. Data converter(s) 605 may include one or more ADCs 605A and/or one or more DACs 605B.

ADC(s) 605A receive analog signal(s) from analog circuitry 620, and convert the analog signal(s) to a digital format, which they communicate to one or more blocks coupled to link 560. Conversely, DAC(s) 605B receive digital signal(s) from one or more blocks coupled to link 560, and convert the digital signal(s) to analog format, which they communicate to analog circuitry 620.

Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to IC 550 to form more complex systems, sub-systems, control blocks or systems, feedback systems, and information processing blocks, as desired.

Control circuitry 570 couples to link 560. Thus, control circuitry 570 may communicate with and/or control the operation of various blocks coupled to link 560 by providing control information or signals. In some embodiments, control circuitry 570 also receives status information or signals from various blocks coupled to link 560. In addition, in some embodiments, control circuitry 570 facilitates (or controls or supervises) communication or cooperation between various blocks coupled to link 560.

In some embodiments, control circuitry 570 may initiate or respond to a reset operation or signal. The reset operation may cause a reset of one or more blocks coupled to link 560, of IC 550, etc., as person of ordinary skill in the art will understand. For example, control circuitry 570 may cause the PMU 580, and circuitry such as the TX circuitry 59, to reset to an initial or known state.

In exemplary embodiments, control circuitry 570 may include a variety of types and blocks of circuitry. In some embodiments, control circuitry 570 may include logic circuitry, finite-state machines (FSMs), or other circuitry to perform operations such as the operations described above.

Communication circuitry 640 couples to link 560 and also to circuitry or blocks (not shown) external to IC 550. Through communication circuitry 640, various blocks coupled to link 560 (or IC 550, generally) can communicate with the external circuitry or blocks (not shown) via one or more communication protocols. Examples of communications include USB, Ethernet, and the like. In exemplary embodiments, other communication protocols may be used, depending on factors such as design or performance specifications for a given application, as person of ordinary skill in the art will understand.

As noted, memory circuit 625 couples to link 560. Consequently, memory circuit 625 may communicate with one or more blocks coupled to link 560, such as processor(s) 565, control circuitry 570, I/O circuitry 585, etc.

Memory circuit 625 provides storage for various information or data in IC 550, such as operands, flags, data, instructions, and the like, as persons of ordinary skill in the art will understand. Memory circuit 625 may support various protocols, such as double data rate (DDR), DDR2, DDR3, DDR4, and the like, as desired.

In some embodiments, memory read and/or write operations by memory circuit 625 involve the use of one or more blocks in IC 550, such as processor(s) 565. A direct memory access (DMA) arrangement (not shown) allows increased performance of memory operations in some situations. More specifically, DMA (not shown) provides a mechanism for performing memory read and write operations directly between the source or destination of the data and memory circuit 625, rather than through blocks such as processor(s) 565.

Memory circuit 625 may include a variety of memory circuits or blocks. In the embodiment shown, memory circuit 625 includes non-volatile (NV) memory 635. In addition, or instead, memory circuit 625 may include volatile memory (not shown), such as random access memory (RAM). NV memory 635 may be used for storing information related to performance, control, or configuration of one or more blocks in IC 550. For example, NV memory 635 may store configuration information related to the PMU 580, the TX circuitry 59, etc.

Various circuits and blocks described above and used in exemplary embodiments may be implemented in a variety of ways and using a variety of circuit elements or blocks. For example, the TX circuitry 59, the power management circuit 53, the monitor circuit 71, the comparator 85, the power control circuit 87, the controller 90, the boost converter 92, and the buck converter 94, or parts of their respective circuitry, may be implemented using digital circuitry. The digital circuitry may include circuit elements or blocks such as gates, digital multiplexers (MUXs), latches, flip-flops, registers, finite state machines (FSMs), processors, programmable logic (e.g., field programmable gate arrays (FPGAs) or other types of programmable logic), arithmetic-logic units (ALUs), standard cells, custom cells, custom analog cells, etc., as desired, and as persons of ordinary skill in the art will understand. In addition, analog circuitry or mixed-signal circuitry or both may be included, for instance, power converters, discrete devices (transistors, capacitors, resistors, inductors, diodes, etc.), and the like, as desired. The analog circuitry may include bias circuits, decoupling circuits, coupling circuits, supply circuits, current mirrors, current and/or voltage sources, filters, amplifiers, converters, signal processing circuits (e.g., multipliers), detectors, transducers, discrete components (transistors, diodes, resistors, capacitors, inductors), analog MUXs and the like, as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus, comprising:
an energy storage circuit;
a power management circuit to receive an input voltage and to provide a first output voltage to the energy storage circuit, wherein the first output voltage is greater than the input voltage; and
a load circuit coupled to the power management circuit to receive a second output voltage of the power management circuit,
wherein the second output voltage is smaller than the first output voltage, and
wherein in response to an input signal the load circuit performs a burst operation.

2. The apparatus according to claim 1, wherein the energy storage circuit comprises a capacitor.

3. The apparatus according to claim 1, further comprising a battery coupled to the power management circuit, wherein the battery provides the input voltage to the power management circuit.

4. The apparatus according to claim 3, wherein the power management circuit improves an effective performance of the battery.

5. The apparatus according to claim 1, further comprising a monitor circuit coupled to monitor the first output voltage and to provide the input signal to the load circuit.

6. The apparatus according to claim 1, wherein the load circuit comprises transmit (TX) circuitry.

7. The apparatus according to claim 6, wherein the TX circuitry asserts a request (REQ) signal to the monitor circuit when the TX circuitry seeks to perform the burst operation.

8. The apparatus according to claim 7, wherein the monitor circuit is powered down until the REQ signal is asserted.

9. The apparatus according to claim 5, wherein the monitor circuit comprises a comparator to compare the first output voltage with a reference voltage.

10. An apparatus, comprising:
a power management circuit to receive an input voltage and to boost the input voltage to generate and provide a storage voltage to an energy storage circuit, the power management circuit to further convert the storage voltage to a supply voltage provided to a load circuit, wherein the storage voltage is greater than the input voltage, and wherein the supply voltage is smaller than the storage voltage; and a monitor circuit to monitor the storage voltage and to provide a signal to the load circuit to indicate when the load circuit may perform a burst operation.

11. The apparatus according to claim 10, wherein the load circuit comprises transmit (TX) circuitry.

12. The apparatus according to claim 10, further comprising a battery to provide the input voltage, wherein the monitor circuit provides the signal to the load circuit to prevent the first output voltage decreasing below a level that would prevent performing the burst operation.

13. The apparatus according to claim 10, wherein the power management circuit comprises a boost converter to boost the input voltage to the storage voltage, and wherein the power management circuit further comprises a buck converter to convert the storage voltage to the supply voltage.

14. The apparatus according to claim 10, further comprising a battery coupled to the power management circuit to provide the input voltage to the power management circuit, wherein the power management circuit improves an effective performance of the battery.

15. A method of supplying power to a load, the method comprising:

receiving an input voltage in a power management circuit and generating a first output voltage greater than the input voltage;

providing the first output voltage to an energy storage circuit;

generating, using the power management circuit, a second output voltage smaller than the first output voltage; and receiving in a load circuit the second output voltage, and in response to an input signal of the load circuit, performing a burst operation.

16. The method according to claim 15, wherein the energy storage circuit comprises a capacitor.

17. The method according to claim 15, wherein the load circuit comprises transmit (TX) circuitry.

18. The method according to claim 15, further comprising asserting a request (REQ) signal when the TX circuitry seeks to perform the burst operation.

19. The method according to claim 15, further comprising monitoring the first output voltage to generate the input signal of the load circuit.

20. The method according to claim 15, wherein receiving the input voltage comprises receiving a battery voltage, and wherein using the power management circuit improves an effective performance of the battery.

* * * * *